United States Patent

Hall

[15] 3,686,524

[45] Aug. 22, 1972

[54] PERMANENT MAGNET MOTORS

[72] Inventor: George D. Hall, Verona, Pa.

[73] Assignee: Rockwell Manufacturing Company, Pittsburgh, Pa.

[22] Filed: Oct. 28, 1970

[21] Appl. No.: 84,799

[52] U.S. Cl.................................310/154, 310/181
[51] Int. Cl...............................................H02k 21/28
[58] Field of Search.....................310/152, 154, 181

[56] References Cited

UNITED STATES PATENTS

| 2,128,044 | 8/1938 | Grabner | 310/181 X |
| 3,201,625 | 8/1965 | Smith et al. | 310/154 |
| 3,427,484 | 2/1969 | Karlby et al. | 310/47 |

Primary Examiner—D. X. Sliney
Attorney—Strauch, Nolan, Neale, Nies & Kurz

[57] ABSTRACT

Permanent magnet motors having improved power output to size ratios, which include a casing of magnetically soft material, permanent magnets housed in the casing, an armature surrounded by the permanent magnets so dimensioned that the ratio of its diameter to the exterior casing diameter is substantially closer to the optimum than in heretofore available permanent magnet motors, and an arrangement for preventing demagnetization of the permanent magnets when the flux generated in the armature is greater than the flux which the permanent magnets can withstand without beginning to demagnetize.

6 Claims, 6 Drawing Figures

Patented Aug. 22, 1972

INVENTOR
GEORGE D. HALL

BY *Strauch, Nolan, Neale, Nies & Kurz*

ATTORNEYS

Patented Aug. 22, 1972 3,686,524
2 Sheets-Sheet 2
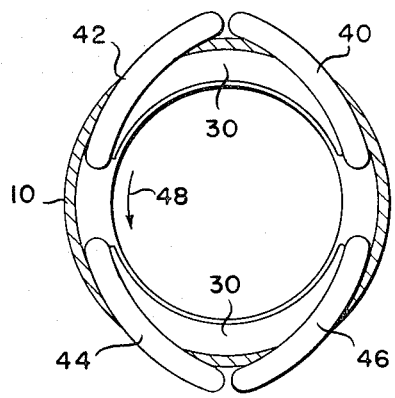
Fig.5
Fig.6
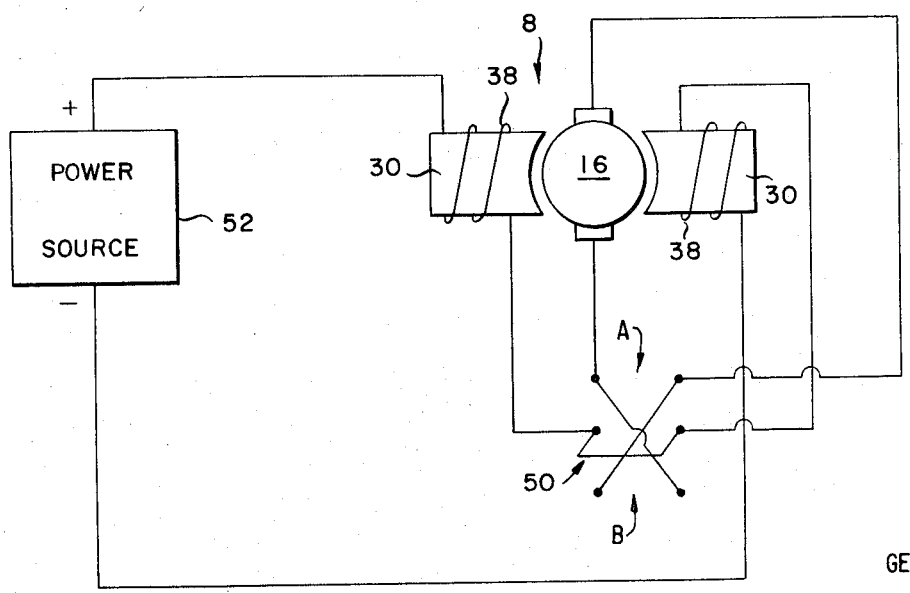
INVENTOR
GEORGE D. HALL
BY *Strauch, Nolan, Neale, Nies & Kurz*
ATTORNEYS

PERMANENT MAGNET MOTORS

This invention relates to electric motors and, more particularly, to novel improved permanent magnet motors.

A permanent magnet motor is one in which permanent magnets are employed to produce the magnetic field rather than conventional field coils. Such motors have a number of advantages including lower power losses and increased efficiency, and they generate less heat. Also, such motors tend to be smaller, lighter, and quieter than motors using wound field coils.

For a permanent magnet motor of a specified size or diameter there is an optimum ratio of the armature diameter to the outer diameter of the casing employed to provide a return path for the magnetic flux. As this ratio is approached, the power output of the motor increases, reaching a peak at the optimum ratio.

Heretofore, it has not been considered possible to produce permanent magnet motors in which the ratio of armature diameter to casing diameter would be anywhere near the optimum. More specifically, in permanent magnet motors flux generated by the armature current ($H_{ARM}$) opposes the flux of the permanent magnets. This flux is the greatest when the motor is started and reversed and during locked rotor conditions since the flow of current through the armature is the greatest during such conditions. The flux which the magnets of a permanent magnet motor can withstand without demagnetization increases with the thickness of the permanent magnets; i.e., a thicker magnet can withstand a greater flux without demagnetizing than a thinner one. In designing permanent magnet motors in accord with heretofore accepted techniques, the permanent magnets are made sufficiently thick to withstand demagnetization under the worst possible conditions; viz., those enumerated above. However, this does not leave enough room in the motor casing for an armature of optimum diameter. Therefore, heretofore available permanent magnet motors have had power outputs well below those indicated by a consideration of the optimum ratio of armature to casing diameters.

I have now discovered that it is not necessary to follow the accepted technique just described in designing permanent magnet motors, and that superior motors can be produced by proceeding in a directly contrary fashion. More specifically, I have found that permanent magnet motors having substantially better power output to size ratios than those heretofore available can be constructed by dimensioning the armatures to produce the optimum armature diameter to casing diameter ratio,[1]([1] Principally because of commutation problems, it is not always possible to employ exactly the optimum ratio of armature to casing diameters in high speed permanent magnet motors in accord with the present invention. However, this optimum ratio can be approached much more closely than is possible in permanent magnet motors constructed in accord with the heretofore accepted techniques described above. In the case of lower speed motors, where commutation is less of a problem, the optimum ratio of diameters can be very closely if not exactly, approached.) thus ignoring the fact that this only leaves room for magnets which are too thin to withstand demagnetization, and relying on techniques other than magnet thickness to prevent demagnetization of the permanent magnets.

Another advantage can also flow from constructing permanent magnet motors in accord with techniques of the present invention. In permanent magnet motors the magnets are surrounded by a shell or casing of a soft magnetic material which provides a return path for the magnetic flux. For a given motor, this shell must have a minimum thickness (which can be calculated by an accepted formula) to satisfactorily carry the magnetic flux. As is well-known to those skilled in the arts to which this invention relates, the thickness of this shell is proportioned to the thickness of the permanent magnets. Therefore, in reducing the thickness of the permanent magnets in accord with the principles of the present invention, the thickness of the surrounding casing is also automatically reduced, further increasing the space available for the armature of the motor.[2]([2] It should be kept in mind, however, that the goal is an optimum armature diameter and that an increase in diameter beyond this optimum is undesirable as power output will then began to decrease due to the offsetting reduction in the flux density of the permanent magnets, etc.)

U.S. Pat. No. 3,247,484 issued Feb. 11, 1969, for Permanent Magnet Stator DC Motor with Hand Tool Gear Train discloses permanent magnet motors in which energized coils wound on the permanent magnets generate a flux opposing the armature flux and thereby prevent demagnetization of the permanent magnets when the armature flux is of high magnitude. However, there is no suggestion in this patent that advantage can be taken of the foregoing alternate technique of preventing demagnetization to optimize the armature diameters of permanent magnet motors and thereby produce consequent increased power outputs without increases in overall motor size.

From the foregoing it will be apparent that the primary object of the present invention resides in the provision of novel, improved permanent magnet motors having higher power output to size ratios than heretofore available permanent magnet motors.

Other important objects and features and further advantages of the invention will become apparent from the appended claims and as the ensuing detailed description and discussion preceeds in conjunction with the accompanying drawing, in which:

FIG. 5 illustrates an arrangement which may be employed to prevent demagnetization of the magnets in reversible permanent magnet motors constructed in accord with the principles of the present invention; and FIG. 6 illustrates an alternate arrangement for preventing demagnetization of the permanent magnets in a reversible permanent magnet motor in accord with the present invention.

Figure 1:
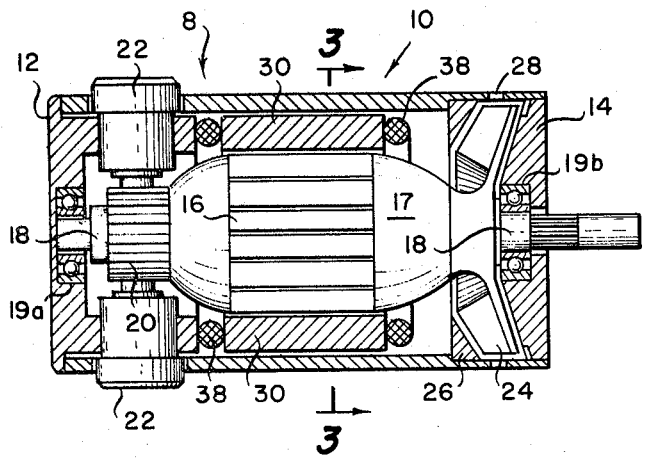
FIG. 1 is a longitudinal section through a permanent magnet motor constructed in accord with and embodying the principles of the present invention.
Figure 2:
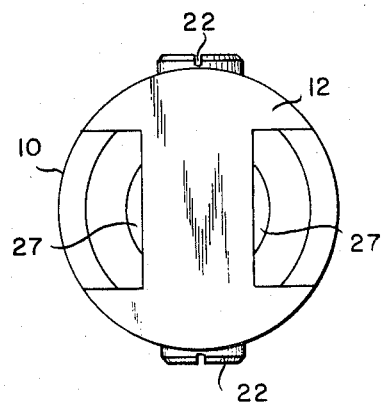
FIG. 2 is a left-hand end view of the motor of FIG. 1.
Figure 3:
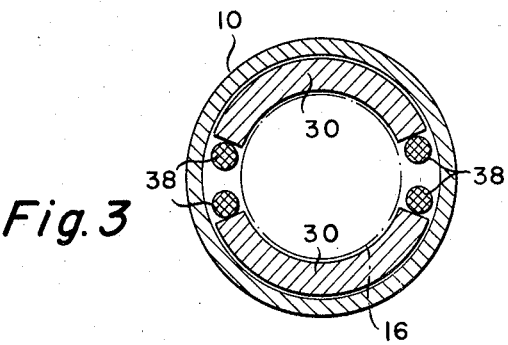
FIG. 3 is a section through the motor of FIG. 1, taken substantially along line 3—3 of the latter FIGURE.

Referring now to FIGS. 1–3 of the drawing, motor 8, which is constructed in accord with the principles of the present invention, includes a cylindrical casing 10 which is fabricated of a soft magnetic material and provides the return path in the magnetic circuit of the motor. Housed in casing 10 are a rear bearing and brush support member 12 and a front bearing support member 14. These may be of plastic or metal and may also act as end members for casing 10.

Also housed in casing 10 is an armature 16 of conventional construction. The armature includes a winding 17 and a shaft 18 which is journalled in rear and front bearings 19a and 19b mounted in support members 12 and 14.

Motor 8 is equipped with the usual commutator 20 and with brush assemblies 22 mounted in support member 12 adjacent the commutator.

A fan 24 is mounted on armature shaft 18 near front bearing 19b and a ring-shaped shroud 26 is positioned between the fan and armature 16. Air is drawn into casing 10 through air intake openings 27 by fan 24. After circulating through the motor, the air discharges through ports 28 located in casing 10 opposite fan 24.

Ceramic or other high coercive permanent magnets 30 are secured in casing 10 around and in spaced relation to armature 16 by any suitable method. These magnets may be of ferrite or Indox,[3]([3.] Magnets of the ferrite type are also known as Magnetoplumite magnets. They are made from a material having the formula $Mo \cdot 6Fe_2O_3$ where M is barium, strontium, and/or lead. Indox ceramic magnets are available in different grades from Indiana General Corp. Suitable magnets are also available from other sources such as the Allen-Bradley Company, for example.) for example.

Magnets of the type just described are susceptible to demagnetization by the flux produced in the armature of the motor. As discussed above, this susceptibility is the greatest when the flow of current through the armature is the highest; i.e., when the motor is started up, reversed, or stalled.

Demagnetization of the magnets in a permanent magnet motor has heretofore been avoided by making the magnets of a specified minimum thickness $t_m$ determined in accord with the following formula:

$$t_m = \frac{1.0 \cos \theta Z I_{LR}}{\Delta H} - t_g$$

where:

$Z$ is the number of conductors in the armature winding, $I_{LR}$ is the locked rotor armature current, $\Delta H$ is the maximum external demagnetizing force the permanent magnets can withstand without beginning to demagnetize at the lowest temperature at which the motor is expected to operate, $t_g$ is the width of the air gaps between the armature and the faces of the permanent magnets, and $\theta$ is one-half the angular distance between the edges of adjacent ones of the permanent magnets when neutral commutation is used.

There is also a formula heretofore used for determining the thickness which the magnetic circuit return path (in this case motor casing 10) must have in order to satisfactorily carry the magnetic flux in a permanent magnet motor. This formula is as follows:

$$t_s = \phi a / \phi_m L,$$

where $\phi_a$ is the total armature flux, $\phi_m$ is the flux density in casing 10 between permanent magnets 30, and $L$ is the length of casing 10.

The design of permanent magnet motors in accord with the foregoing formulas has a decided disadvantage. Namely, as discussed above, the casing and permanent magnets occupy so much of a motor of given outer diameter that the armature can not be made large enough to produce an optimum power output.

Figure 4:
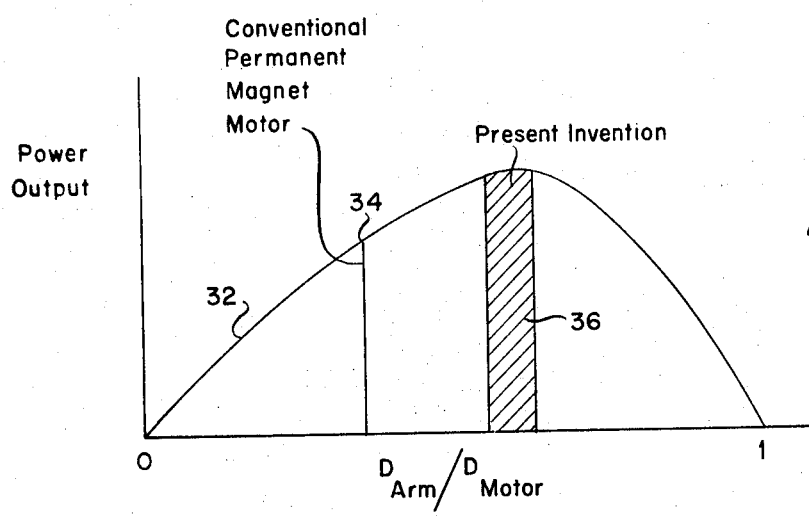
FIG. 4 is a plot of power output versus the ratio of armature diameter to casing diameter for a typical family of permanent magnet motors and shows the operating points along this curve for a conventionally designed permanent magnet motor and for a permanent magnet motor in accord with the principles of the present invention.

In this regard, FIG. 4 contains a curve 32 in which power output is plotted against the ratio of armature diameter to overall motor diameter for a family of permanent magnet motors[4]([4.] By "overall motor diameter" is meant the outer diameter of the casing employed to complete the magnetic path in a permanent magnet motor.) in which this ratio is the only variable. In a permanent magnet motor designed by the heretofore employed techniques described above, the maximum diameter ratio which can be employed after provision is made for the casing and permanent magnets is represented by point 34 on curve 32. It is readily apparent that this ratio is well below the optimum and that the output of the motor could readily be increased if it were possible to increase the diameter of the motor armature relative to the overall motor diameter. However, heretofore, it was thought that it was impossible to do so because this would require a decrease in the thickness of either the permanent magnets or the motor casing or both below the values determined by the formulas specified above. In both cases it was thought that this would result in disadvantages sufficiently serious to more than offset the improvements in performance which could be realized by increasing the armature diameter.

I have now found that the assumptions discussed in the preceding paragraph are not inviolate. Thus, in the permanent magnet motors of the present invention I purposely employ magnets and casings which are thinner than those indicated by the formulas described above. This allows me to increase the armature diameter to such an extent that the ratio of the armature diameter to the overall motor diameter lies in the shaded region identified by reference character 36 in FIG. 4. With the armature motor diameter ratio in this region, the power output of the motor is near or at the theoretical maximum as is apparent from FIG. 4. Accordingly, by employing the principles of my invention, it is possible to produce a marked increased in the power output of a permanent magnet motor of given overall size.[5]([5.] Magnets dimensioned in accord with the principles of the present invention can be less than one-half as thick as would be indicated by the formula for $t_m$ described above. Magnets appreciably thinner than $t_m/2$ are, however, in general not desirable because of low structural strength, etc. and because they will not normally be required to make room for an armature of optimum diameter.)

The magnets of my novel motors are not by themselves capable of withstanding demagnetization under locked rotor conditions because they have a thickness less than $t_m$. Accordingly, I take advantage of the wound magnet technique disclosed in U.S. Pat. No. 3,427,484 to prevent demagnetization of the permanent magnets. That is, in the novel motors of the present invention, demagnetization of magnets 30 is prevented by surrounding at least the trailing edges of the magnets with coils 38 as shown in FIGS. 1 and 3 (it is not essential that coils 38 completely surround magnets 30 since demagnetization occurs primarily at the trailing side of a permanent magnet).

In determining the wire size and minimum number of turns in coils 38, the maximum demagnetizing effect produced by the armature is determined by calculation or by test. The demagnetization resisting force of the permanent magnets is also determined. The difference is the demagnetizing force which coils 38 must supply to prevent demagnetization of the permanent magnets. Coils which will produce this required opposing force in the most susceptible regions of the magnets and under the most adverse conditions can be selected on the basis of calculation or actual test or by a combination of both of these techniques. Generally, it is preferred that the coils be capable of generating a flux field which is form about one-fifth to one-half of the field generated by the permanent magnets at rated conditions as this will provide sufficient demagnetization resisting force under the most adverse conditions, but will not create a force so large as to undesirably alter the operating characteristics of the motor. For a motor in which case 10 had a 2-inch outer diameter and there was a length between bearing support members 12 and 14 of 3 inches and an armature 16, 1 5/32 inches in diameter, coils consisting of approximately 40 turns of No. 24 wire connected in series with the armature were found to provide ample protection against demagnetization of the permanent magnets.

For a reversible motor, a coil arrangement of the type illustrated in FIG. 5 may be used. In this embodiment four coils 40, 42, 44, and 46 are provided with two coils (40 and 42 or 44 and 46) being wound on each magnet, one at each edge. The coils can be energized simultaneously or in pairs. For armature rotation in the direction indicated in FIG. 5 by arrow 48, energization of coils 42 and 44 on the trailing edges of the magnet provided results substantially as good as were obtained when all four coils were energized. For armature rotation in the opposite direction, coils 40 and 44 can be energized.

FIG. 6 shows another coil arrangement which may be employed where reversibility of the direction of motor rotation is desired. In this embodiment of the invention, switch 50 can be thrown to position A to cause armature 16 to rotate in one direction and to position B to reverse the direction of flow from power source 52 through the armature and thereby cause it to rotate in the opposite direction. In both switch positions the current flows in the same direction through coils 38. Thus the flux produced by coils 38 is additive to that produced by magnets 30 and protects the latter against demagnetization irrespective of the direction of armature rotation.

Coils 38 of FIGS. 1–3 and 6 and coils 40, 46 of FIG. 5 may be connected either across or in series with the armature. However, the series connection is in general preferred since protection against demagnetization can be achieved with a fewer number of turns. Furthermore, the current through the coils diminishes as the motor reaches rated speed if the series connection is employed. Consequently, at normal operating speed, the magnets 30 predominate; and the motor operates essentially as a shunt motor. This is desirable because of the constant speed characteristics of shunt motors.

Other advantages also flow from the use of coils as described above including improved commutation and improvements in the form factor of the armature current. These aspects of the use of wound magnets in permanent magnet motors are described in U.S. Pat. No. 3,427,484 to which the reader may refer, if desired.

The principles of the present invention are applicable not only to the exemplary motor 8 illustrated in the drawing, but to permanent magnet motors in general. Accordingly, to the extent that other applications of the invention are not expressly excluded from the appended claims, they are fully intended to be covered therein.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A permanent magnet motor having an improved power output to size ratio, comprising a rotatably mounted armature; permanent magnets surrounding said armature and spaced therefrom to provide an air gap between the magnets and the armature; and a casing of magnetically soft material surrounding said permanent magnets to provide a return path for the magnetic flux, the diameter of said armature being greater than $$D_m - 2[t_m + t_s],$$

where:

$D_m$ is the outside diameter of the casing, $t_m$ is the minimum required thickness of the permanent magnets and is equal to $$\frac{0.1 \cos \theta Z I_{LR}}{\Delta H} - t_g$$

$t_s$ is the minimum wall thickness of the casing and is equal to $$\phi a/\phi_m L,$$

$Z$ is the number of conductors in the armature winding, $I_{LR}$ is the locked rotor armature current, $\Delta H$ is the maximum external demagnetizing force the permanent magnets can withstand without beginning to demagnetize at the lowest temperature at which the motor is expected to operate, $t_g$ is the width of the air gaps between the armature and the permanent magnets, $\phi$ is one-half the angular distance between the edges of adjacent ones of the permanent magnets when neutral commutation is used, $\phi_a$ is the total armature flux, $\phi_m$ is the flux density in the casing between the permanent magnets, and $L$ is the length of the casing;

said motor further including means for preventing demagnetization of the magnets when $H_{ARM}$ is equal to or greater than $\Delta H$, where $H_{ARM}$ is the external field on the magnets attributable to the magnetomotive force of the armature.

2. The permanent magnet motor of claim 1, wherein the means for preventing demagnetization of the permanent magnets comprises coils connectable to a current source and so wound on said permanent magnets as to produce a magnetic flux additive to that produced by the permanent magnets and opposing that resulting from the armature current when they are energized.

3. The permanent magnet motor of claim 2, together with switch means operable to reverse the direction of current flow through said armature without reversing the direction of current flow through said coils to thereby reverse the direction of armature rotation without alteration of the additive relationship between the flux produced by the current flowing in said coils and the flux produced by the permanent magnets, whereby said permanent magnets are protected against demagnetization irrespective of the direction of rotation of said armature.

4. The permanent magnet motor of claim 2, where said coils are so constructed as to produce on the order of about one-fifth to about one-half of the magnetomotive force produced by the permanent magnets at rated motor conditions.

5. The permanent magnet motor of claim 2, wherein there are first and second coils wound on each of said permanent magnets, said first coils being adapted to be connected to said armature winding when the armature is rotating in one direction and the second coils being adapted to be connected to the armature winding when the armature is rotating in the opposite direction to thereby protect said permanent magnets against demagnetization irrespective of the direction of rotation of said armature.

6. The permanent magnet motor of claim 1, wherein the thickness of the permanent magnets is not more than about $t_m/2$, wherein $t_m$ is as aforesaid.

* * * * *